United States Patent
Kim et al.

(10) Patent No.: US 9,985,287 B2
(45) Date of Patent: May 29, 2018

(54) ELECTRODE INCLUDING DIFFERENT ELECTRODE MATERIAL LAYERS AND LITHIUM SECONDARY BATTERY

(71) Applicant: LG Chem, Ltd., Seoul (KR)

(72) Inventors: Kyoung Ho Kim, Daejeon (KR); In Sung Uhm, Daejeon (KR); Ji Yoon Kwon, Daejeon (KR); Hoe Jin Hah, Daejeon (KR); Il Hong Kim, Daejeon (KR)

(73) Assignee: LG Chem, Ltd. (KR)

( * ) Notice: Subject to any disclaimer, the term of this patent is extended or adjusted under 35 U.S.C. 154(b) by 8 days.

(21) Appl. No.: 14/893,352

(22) PCT Filed: Jul. 28, 2014

(86) PCT No.: PCT/KR2014/006879
§ 371 (c)(1),
(2) Date: Nov. 23, 2015

(87) PCT Pub. No.: WO2015/016554
PCT Pub. Date: Feb. 5, 2015

(65) Prior Publication Data
US 2016/0133930 A1    May 12, 2016

(30) Foreign Application Priority Data

Jul. 31, 2013  (KR) .................. 10-2013-0090557

(51) Int. Cl.
*H01M 4/58*     (2010.01)
*H01M 10/0525*  (2010.01)
(Continued)

(52) U.S. Cl.
CPC ......... *H01M 4/5825* (2013.01); *H01M 4/131* (2013.01); *H01M 4/136* (2013.01);
(Continued)

(58) Field of Classification Search
CPC ......... H01M 10/0525; H01M 2220/30; H01M 4/131; H01M 4/136; H01M 4/366;
(Continued)

(56) References Cited

U.S. PATENT DOCUMENTS

| 2002/0132167 A1* | 9/2002 | Gan | .................. | H01M 4/04 |
| | | | | 429/241 |
| 2003/0010631 A1 | 1/2003 | Anzai | | |

(Continued)

FOREIGN PATENT DOCUMENTS

| CA | 2535064 A1 | 8/2007 |
| CN | 1964101 A | 5/2007 |

(Continued)

OTHER PUBLICATIONS

International Search Report for Application No. PCT/KR2014/006879 dated Oct. 30, 2014.

(Continued)

*Primary Examiner* — Ula C Ruddock
*Assistant Examiner* — Ben Lewis
(74) *Attorney, Agent, or Firm* — Lerner, David, Littenberg, Krumholz & Mentlik, LLP

(57) ABSTRACT

Disclosed is an electrode including a current collector and an electrode material layer formed on the current collector, the electrode material layer including a first electrode material layer and second electrode material layer having different electrode active materials.

14 Claims, 2 Drawing Sheets

(51) Int. Cl.
    *H01M 4/505*     (2010.01)
    *H01M 4/131*     (2010.01)
    *H01M 4/136*     (2010.01)
    *H01M 4/36*     (2006.01)
    *H01M 4/38*     (2006.01)
    *H01M 4/587*     (2010.01)

(52) U.S. Cl.
    CPC ............ *H01M 4/366* (2013.01); *H01M 4/505* (2013.01); *H01M 4/582* (2013.01); *H01M 4/386* (2013.01); *H01M 4/587* (2013.01); *H01M 10/0525* (2013.01); *H01M 2220/30* (2013.01)

(58) Field of Classification Search
    CPC ...... H01M 4/386; H01M 4/505; H01M 4/582; H01M 4/5825; H01M 4/587
    See application file for complete search history.

(56) References Cited

U.S. PATENT DOCUMENTS

| | | | |
|---|---|---|---|
| 2006/0099495 A1* | 5/2006 | Suzuki | H01M 2/021 429/128 |
| 2007/0015058 A1 | 1/2007 | Takezawa et al. | |
| 2007/0026312 A1 | 2/2007 | Imachi et al. | |
| 2009/0253043 A1 | 10/2009 | Bak | |
| 2009/0301866 A1 | 12/2009 | Zaghib et al. | |
| 2011/0294009 A1 | 12/2011 | Kawakami et al. | |
| 2012/0045694 A1 | 2/2012 | Park et al. | |
| 2012/0121979 A1 | 5/2012 | Okada et al. | |

FOREIGN PATENT DOCUMENTS

| | | |
|---|---|---|
| EP | 1619733 A1 | 1/2006 |
| JP | 2003017060 A | 1/2003 |
| JP | 2003197180 A | 7/2003 |
| JP | 2006134770 A | 5/2006 |
| JP | 2007035589 A | 2/2007 |
| JP | 2009009753 A | 1/2009 |
| JP | 2010020912 A | 1/2010 |
| JP | 2011060607 A | 3/2011 |
| JP | 2012009418 A | 1/2012 |
| KR | 20060001430 A | 1/2006 |
| KR | 20060052499 A | 5/2006 |
| KR | 20080020892 A | 3/2008 |
| KR | 20130050473 A | 5/2013 |

OTHER PUBLICATIONS

Search Report for Chinese Application No. 201480030801.0 dated Jan. 20, 2017.
Extended Search Report from European Application No. 14831744.9, dated Oct. 31, 2016.

* cited by examiner

[Fig. 1]
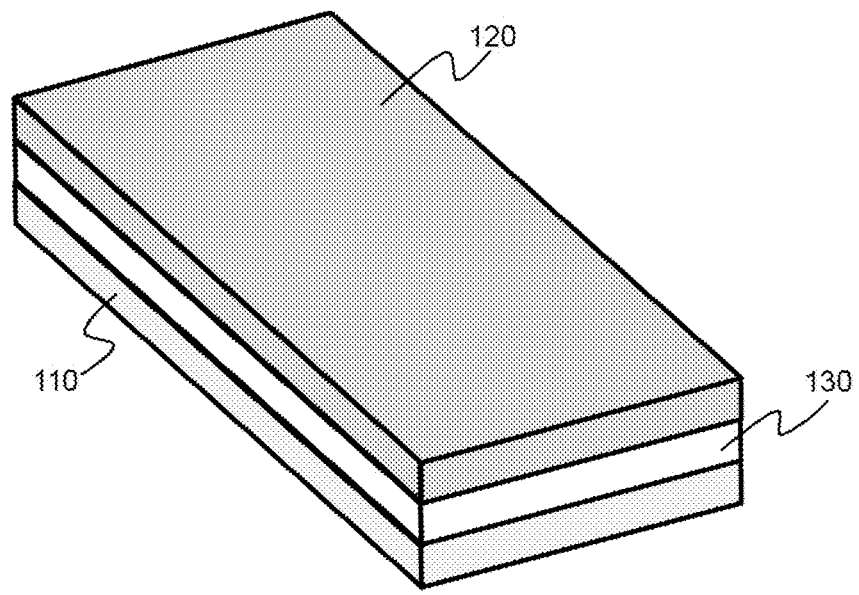
[Fig. 2]
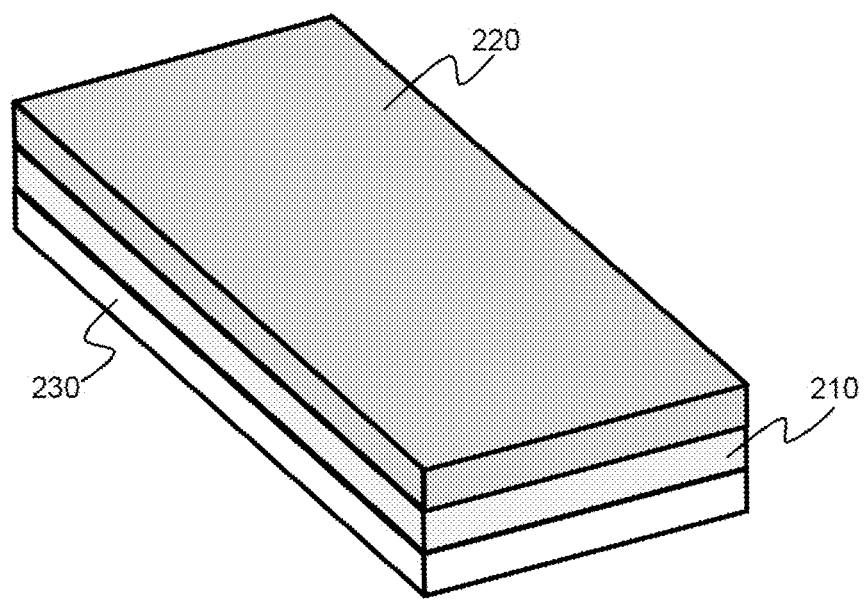

[Fig. 3]
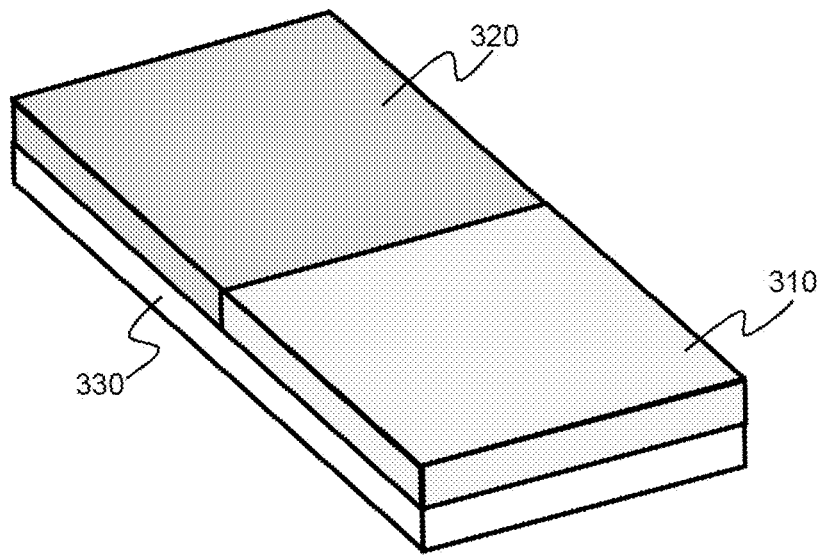
[Fig. 4]
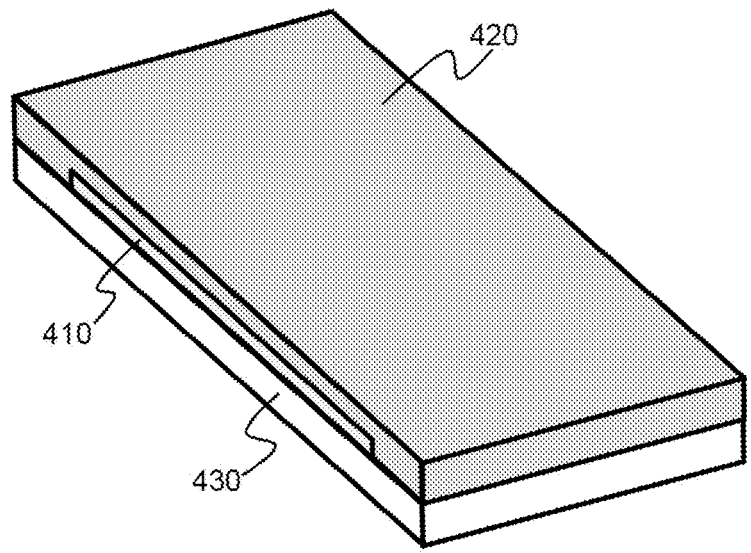

//(1)
ELECTRODE INCLUDING DIFFERENT ELECTRODE MATERIAL LAYERS AND LITHIUM SECONDARY BATTERY

CROSS-REFERENCE TO RELATED APPLICATION

This application is a national phase entry under 35 U.S.C. § 371 of International Application No. PCT/KR2014/006879, filed Jul. 28, 2014, which claims priority to Korean Patent Application No. 10-2013-0090557, filed Jul. 31, 2013, the disclosures of which are incorporated herein by reference.

TECHNICAL FIELD

The present invention relates to an electrode including different electrode material layers and a lithium secondary battery comprising the electrode.

BACKGROUND ART

As mobile device technology continues to develop and demand therefor continues to increase, demand for secondary batteries as energy sources is rapidly increasing. Among these secondary batteries, research on lithium secondary batteries, which exhibit high energy density and discharge voltage, is underway and such lithium secondary batteries are commercially available and widely used.

In general, secondary batteries have a structure in which an electrode assembly including a positive electrode, a negative electrode, and a separator disposed therebetween is accommodated in a laminated or wound form in a battery case made of a metal can or a laminate sheet and an electrolyte is injected thereinto or the electrode assembly is impregnated with an electrolyte.

As a positive electrode active material of such secondary batteries, Mn-rich positive electrode active materials are used. However, Mn-rich active materials contain a large amount of Mn—O, and thus, have low conductivity. Accordingly, batteries including Mn-rich active materials have low output, much lower output at low temperature.

Therefore, there is an urgent need to develop a novel electrode and lithium secondary battery that address the problems described above.

DISCLOSURE

Technical Problem

Therefore, the present invention has been made to solve the above and other technical problems that have yet to be resolved.

The present invention aims to provide an electrode having enhanced low-temperature output and energy density, and a lithium secondary battery.

Technical Solution

In accordance with one aspect of the present invention, provided is an electrode including a current collector; and an electrode material layer formed on the current collector. The electrode material layer may include a first electrode material layer and a second electrode material layer having different electrode active materials.

That is, the electrode according to the present invention includes a first electrode material layer and a second electrode material layer having different electrode active materials, and thus, low-temperature output and energy density may be enhanced.

The first electrode material layer may be formed on a side of the current collector, and the second electrode material layer may be formed on the other side of the current collector.

The electrode material layer on the side of the current collector may include a laminated first electrode material layer and second electrode material layer structure.

The electrode material layer on the other side of the current collector may include a laminated first electrode material layer and second electrode material layer structure.

The laminated structure of the electrode material layer on the other side of the current collector may be symmetrical to the laminated structure of the electrode material layer on the side of the current collector, with the respect to the current collector.

The first electrode material layer may be formed on a side of the current collector, and the second electrode material layer may be formed on the first electrode material layer.

A thickness of the first electrode material layer may be 30 µm or more and 300 µm or less, and a thickness of the second electrode material layer may be 1 µm or more and 300 µm or less.

The first electrode material layer may be formed on a portion of a side of the current collector, and the second electrode material layer may be formed on a different portion, which does not overlap with the portion, of the side of the current collector.

An area ratio of the first electrode material layer:the second electrode material layer may be 3:7 to 9:1.

The second electrode material layer may cover the first electrode material layer.

A value obtained by subtracting a thickness of the first electrode material layer from a thickness of the second electrode material layer may be 1 µm or more and 300 µm or less.

Each of the first electrode material layer or the second electrode material layer may include at least one compound selected from the group consisting of a compound represented by Formula (1) below, a compound represented by Formula (2) below and a compound represented by Formula (3) below, as an electrode active material.

$$Li_xM_yMn_{2-y}O_{4-z}A_z \quad (1),$$

wherein $0.9 \leq x \leq 1.2$, $0<y<2$ and $0 \leq z<0.2$;

M is at least one element selected from the group consisting of Al, Mg, Ni, Co, Fe, Cr, V, Ti, Cu, B, Ca, Zn, Zr, Nb, Mo, Sr, Sb, W, Ti and Bi; and A is at least one monovalent or divalent anion.

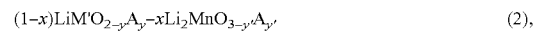

$$(1-x)LiM'O_{2-y}A_y\text{-}xLi_2MnO_{3-y'}A_{y'} \quad (2),$$

wherein M' is $Mn_aM_b$;

M is at least one selected from the group consisting of Ni, Ti, Co, Al, Cu, Fe, Mg, B, Cr, Zr, Zn and Period II transition metals;

A is at least one selected from the group consisting of anions such as $PO_4$, $BO_3$, $CO_3$, F and $NO_3$;

$0<x<1$; $0<y\leq 0.02$; $0<y'\leq 0.02$; $0.5\leq a\leq 1.0$; $0\leq b\leq 0.5$; and $a+b=1$.

$$Li_{1+a}Fe_{1-x}M''_x(PO_{4-b})X_b \quad (3),$$

wherein M'' is at least one selected from Al, Mg and Ti, X is at least one selected from F, S and N, and $-0.5\leq a\leq +0.5$, $0\leq x\leq 0.5$, and $0\leq b\leq 0.1$.

The first electrode material layer may include at least one lithium metal oxide selected from the compound represented by Formula (1) and the compound represented by Formula (2), as an electrode active material, and the second electrode material layer includes lithium metal phosphate represented by Formula (3), as an electrode active material.

The present invention also provides a lithium secondary battery including the electrode as a positive electrode.

The lithium secondary battery may include a carbon based material and/or Si as a negative electrode active material.

The lithium secondary battery may be a lithium ion battery, a lithium ion polymer battery, a lithium polymer battery.

The electrode may be a positive electrode or a negative electrode and may be fabricated using a manufacturing method including the following processes.

The method of manufacturing an electrode includes:
preparing a binder solution by dispersing or dissolving a binder in a solvent,
preparing an electrode slurry by mixing the binder solution with an electrode active material and a conductive material,
coating the electrode slurry onto a current collector,
drying the electrode, and
compressing the electrode to a certain thickness.

In some cases, the method may further include drying the compressed electrode.

The preparing of the binder solution is a process of preparing a binder solution by dispersing or dissolving a binder in a solvent.

The binder may be all binders known in the art and, in particular, may be one selected from the group consisting of fluorine resin-based binders including polyvinylidene fluoride (PVdF) or polytetrafluoroethylene (PTFE), rubber-based binders including styrene-butadiene rubber, acrylonitrile-butadiene rubber or styrene-isoprene rubber, cellulose-based binders including carboxymethylcellulose (CMC), starch, hydroxypropylcellulose or regenerated cellulose, polyalcohol-based binders, polyolefin-based binders including polyethylene or polypropylene, polyimide-based binders, polyester-based binders, mussel adhesives, and silane-based binders, or a mixture or copolymer of at least two of the above-listed binders.

The solvent may be selectively used depending upon kind of a binder, e.g., an organic solvent such as isopropyl alcohol, N-methylpyrrolidone (NMP), acetone or the like, water, or the like.

In a specific embodiment of the present invention, a binder solution for positive electrodes may be prepared by dispersing/dissolving PVdF in N-methylpyrrolidone (NMP), and a binder solution for negative electrodes may be prepared by dispersing/dissolving styrene-butadiene rubber (SBR)/carboxymethylcellulose (CMC) in water.

An electrode slurry may be prepared by mixing/dispersing an electrode active material and a conductive material in the binder solution. The prepared electrode slurry may be transferred to a storage tank and stored prior to use in a coating process. To prevent the electrode slurry from hardening, the electrode slurry may be continuously stirred in the storage tank.

The electrode active material may be a positive electrode active material or a negative electrode active material.

In particular, the positive electrode active material may be layered compounds such as lithium cobalt oxide (LiCoO$_2$) and lithium nickel oxide (LiNiO$_2$), or compounds substituted with one or more transition metals; lithium manganese oxides represented by formula Li$_{1+y}$Mn$_{2-y}$O$_4$ where 0≤y≤0.33, such as LiMnO$_3$, LiMn$_2$O$_3$, and LiMnO$_2$; lithium copper oxide (Li$_2$CuO$_2$); vanadium oxides such as LiV$_3$O$_8$, LiV$_3$O$_4$, V$_2$O$_5$, and Cu$_2$V$_2$O$_7$; Ni-site type lithium nickel oxides having formula LiNi$_{1-y}$M$_y$O$_2$ where M=Co, Mn, Al, Cu, Fe, Mg, B, or Ga, and 0.01≤y≤0.3; lithium manganese composite oxides having formula LiMn$_{2-y}$M$_y$O$_2$ where M=Co, Ni, Fe, Cr, Zn, or Ta, and 0.01≤y≤0.1 or formula Li$_2$Mn$_3$MO$_8$ where M=Fe, Co, Ni, Cu, or Zn; LiMn$_2$O$_4$ where some of the Li atoms are substituted with alkaline earth metal ions; disulfide compounds; Fe$_2$(MoO$_4$)$_3$; or the like, but embodiments of the present invention are not limited thereto.

In a non-limiting embodiment, the electrode active material may include a spinel-structure lithium metal oxide represented by Formula (1) below as a positive electrode active material:

$$\text{Li}_x\text{M}_y\text{Mn}_{2-y}\text{O}_{4-z}\text{A}_z \qquad (1)$$

wherein 0.9≤x≤1.2, 0<y<2 and 0≤z<0.2,

M is at least one element selected from the group consisting of Al, Mg, Ni, Co, Fe, Cr, V, Ti, Cu, B, Ca, Zn, Zr, Nb, Mo, Sr, Sb, W, Ti and Bi, and A is at least one monovalent or divalent anion.

A maximum substitution amount of A may be less than 0.2 mol % and, in particular, A may be at least one anion selected from the group consisting of halogens such as F, Cl, Br and I, S, and N.

Due to substitution of these anions, bonding strength between the anion and the transition metal is increased, structural transition of the compound of Formula (1) is prevented, and thus, lifespan of the lithium secondary battery may be enhanced. On the other hand, when the substitution amount of A is too large (t≥0.2), lifespan characteristics of the lithium secondary battery may be rather deteriorated due to unstable crystal structure of the compound of Formula (1).

In particular, the spinel-structure lithium metal oxide of Formula (1) may be a lithium metal oxide represented by Formula (2) below:

$$\text{Li}_x\text{Ni}_y\text{Mn}_{2-y}\text{O}_4 \qquad (2),$$

wherein 0.9≤x≤1.2 and 0.4≤y≤0.5.

More specifically, the lithium metal oxide may be LiNi$_{0.5}$Mn$_{1.5}$O$_4$ or LiNi$_{0.4}$Mn$_{1.6}$O$_4$.

The negative electrode active material may further include, for example, carbon such as hard carbon, graphite based carbon; metal composite oxides such as Li$_x$Fe$_2$O$_3$ (0≤x≤1, Li$_x$WO$_2$ where 0≤x≤1, Sn$_x$Me$_{1-x}$Me'$_y$O$_z$ where Me: Mn, Fe, Pb or Ge; Me': Al, B, P, Si, Group I, Group II and Group III elements, or halogens; 0<x≤1; 1≤y≤3; and 1≤z≤8); lithium metals; lithium alloys; silicon-based alloys; tin-based alloys; metal oxides such as SnO, SnO$_2$, PbO, PbO$_2$, Pb$_2$O$_3$, Pb$_3$O$_4$, Sb$_2$O$_3$, Sb$_2$O$_4$, Sb$_2$O$_5$, GeO, GeO$_2$, Bi$_2$O$_3$, Bi$_2$O$_4$, and Bi$_2$O$_5$; conductive polymers such as polyacetylene; Li—Co—Ni-based materials; and the like.

In a non-restrictive embodiment, the electrode active material may include a lithium metal oxide as a negative electrode active material, in which the lithium metal oxide may be represented by Formula (3) below:

$$\text{Li}_a\text{M'}_b\text{O}_{4-c}\text{A}_c \qquad (3)$$

wherein M' is at least one element selected from the group consisting of Ti, Sn, Cu, Pb, Sb, Zn, Fe, In, Al, and Zr;

0.1≤a≤4 and 0.2≤b≤4 wherein a and b are determined according to oxidation number of M';

0≤c<0.2 wherein c is determined according to oxidation number of A; and

A is at least one monovalent or divalent anion.

The lithium metal oxide of Formula (3) may be represented by Formula (4) below:

$$Li_aTi_bO_4 \quad (4)$$

wherein 0.5≤a≤3 and 1≤b≤2.5.

Examples of the lithium metal oxide include, but are not limited to, $Li_{0.8}Ti_{2.2}O_4$, $Li_{2.67}Ti_{1.33}O_4$, $LiTi_2O_4$, $Li_{1.33}Ti_{1.67}O_4$, and $Li_{1.14}Ti_{1.71}O_4$.

In a non-restrictive embodiment, the lithium metal oxide may be $Li_{1.33}Ti_{1.67}O_4$ or $LiTi_2O_4$. $Li_{1.33}Ti_{1.67}O_4$ has a spinel structure having a small change in crystal structure during charge/discharge and high reversibility.

The lithium metal oxide may be prepared using a manufacturing method known in the art, for example, solid-state reaction, a hydrothermal method, a sol-gel method, or the like.

The lithium metal oxide may have a form of secondary particles in which primary particles are agglomerated with one another.

Diameters of the secondary particles may be 200 nm to 30 μm.

When the diameters of the secondary particles are less than 200 nm, a large amount of solvent is needed in the process of preparing a negative electrode slurry and, thus, productivity is reduced and it is difficult to control the amount of moisture. When the diameter of the secondary particles exceeds 30 μm, diffusion rate of lithium ions becomes slow and, thus, it may be difficult to achieve high output.

The amount of the lithium metal oxide may be 50 wt % to 100 wt % with respect to the total weight of the negative electrode active material.

A case in which the amount of lithium titanium oxide is 100 wt % with respect to the total weight of the negative electrode active material means that the negative electrode active material is formed of lithium titanium oxide alone.

The conductive material is not particularly limited so long as it has conductivity and does not cause chemical changes in the fabricated battery. Examples of conductive materials include graphite such as natural or artificial graphite; carbon black such as carbon black, acetylene black, Ketjen black, channel black, furnace black, lamp black, and thermal black; conductive fibers such as carbon fiber and metallic fibers; metallic powders such as carbon fluoride powder, aluminum powder, and nickel powder; conductive whiskers such as zinc oxide and potassium titanate; conductive metal oxides such as titanium oxide; and polyphenylene derivatives.

The electrode slurry may optionally include a filler or the like, as desired. The filler is not particularly limited so long as it is a fibrous material that does not cause chemical changes in the fabricated battery. Examples of the filler include olefin based polymers such as polyethylene and polypropylene; and fibrous materials such as glass fiber and carbon fiber.

The coating of the electrode slurry is a process of coating the electrode slurry on a current collector in a predetermined pattern and to a uniform thickness by passing through a coater head.

The coating of the electrode slurry may be performed by applying the electrode slurry to the current collector and uniformly dispersing the electrode slurry thereon using a doctor blade, etc. In another embodiment, the coating process may be performed by die-casting, comma coating, screen-printing, or the like. In another embodiment, the electrode slurry may be molded on a separate substrate and then adhered to a current collector via pressing or lamination.

The current collector is not particularly limited so long as it does not cause chemical changes in the fabricated secondary battery and has high conductivity. For example, the current collector may be made of copper, stainless steel, aluminum, nickel, titanium, sintered carbon, copper or stainless steel surface-treated with carbon, nickel, titanium, silver, or the like, or aluminum-cadmium alloys. A positive electrode current collector may have fine irregularities at a surface thereof to increase adhesion between a positive electrode active material and the positive electrode current collector, and be used in any of various forms including films, sheets, foils, nets, porous structures, foams, and non-woven fabrics. In particular, the positive electrode current collector may be a metal current collector including aluminum, and a negative electrode current collector may be a metal current collector including copper. The electrode current collector may be metal foil, e.g., Al foil or Cu foil.

The drying process is a process of removing solvent and moisture from the electrode slurry in order to dry the electrode slurry coated on the metal current collector. In a specific embodiment, the drying process is performed in a vacuum oven at 50 to 200° C. for one day or less.

The electrode manufacturing method may further include a cooling process after the drying process. The cooling process may be performed by slowly cooling up to room temperature such that a recrystallized structure of the binder is satisfactorily formed.

In order to increase capacity density of the coating-completed electrode and to increase adhesion between the current collector and the corresponding active materials, the electrode may be compressed to a desired thickness by passing between two high-temperature-heated rolls. This process is referred to as a rolling process.

Before passing the electrode between the two high-temperature-heated rolls, the electrode may be subjected to a preheating process. The preheating process is a process of preheating the electrode before passing between the rolls in order to enhance compression effects of the electrode.

The rolling-completed electrode may be dried in a vacuum oven at 50 to 200° C. for one day or less, within a temperature range that is equal to or greater than a melting point of the binder. The rolled electrode may be cut to a uniform length and then dried.

After the drying process, a cooling process may be further performed. The cooling process may be performed by slowly cooling to room temperature such that a recrystallized structure of the binder is satisfactorily formed.

The polymer layer is a separator separating the positive electrode from the negative electrode and, when a solid electrolyte such as a polymer is used as an electrolyte, the solid electrolyte may also act as a separator.

The separator may be an insulating thin film having high ion permeability and mechanical strength. A pore diameter of the separator is typically 0.01 to 10 μm and a thickness thereof is typically 5 to 300 μm.

As the separator, sheets or non-woven fabrics made of an olefin polymer such as polypropylene, glass fibers, or polyethylene, which have chemical resistance and hydrophobicity, Kraft paper, etc. may be used. Examples of commercially available separators include Celgard type products (Celgard® 2400, 2300 (Hoechest Celanese Corp.)), polypropylene separators (Ube Industries Ltd. or Pall RAI), polyethylene type separators (Tonen or Entek), and the like.

In some cases, the separator may be coated with a gel polymer electrolyte in order to increase stability of the lithium secondary battery. Examples of gel polymers include, but are not limited to, polyethylene oxide, polyvinylidene fluoride, and polyacrylonitrile.

Examples of the electrode laminate include a jellyroll type electrode assembly (or a winding-type electrode assembly), a laminated electrode assembly, and a laminated and folded electrode assembly, which are known in the art.

As used herein, the laminated and folded electrode assembly may be understood to include laminated and folded electrode assemblies manufactured by arranging a unit cell having a structure in which a separator is disposed between a positive electrode and a negative electrode on a separator sheet and then folding or winding the separator sheet.

In addition, the electrode laminate may include an electrode laminate having a structure, wherein any one of a positive electrode and a negative electrode is disposed between separators and, in such a stacked state, is laminated according to a method such as thermal bonding.

The electrolyte may be a non-aqueous electrolyte, an organic solid electrolyte, inorganic solid electrolyte, or the like.

Examples of the non-aqueous electrolyte include aprotic organic solvents such as N-methyl-2-pyrollidinone, propylene carbonate, ethylene carbonate, butylene carbonate, dimethyl carbonate, diethyl carbonate, ethylmethyl carbonate, gamma-butyrolactone, 1,2-dimethoxy ethane, 1,2-diethoxy ethane, tetrahydrofuran, 2-methyl tetrahydrofuran, dimethylsulfoxide, 1,3-dioxolane, 4-methyl-1,3-dioxene, diethyl ether, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate, etc.

Examples of the organic solid electrolyte include, but are not limited to, polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

Examples of the inorganic solid electrolyte include, but are not limited to, nitrides, halides and sulfates of lithium (Li) such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, $Li_3PO_4$—$Li_2S$—$SiS_2$.

A lithium salt is a material that is readily soluble in the non-aqueous electrolyte and examples thereof include, but are not limited to, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $LiSCN$, $LiC(CF_3SO_2)_3$, $(CF_3SO_2)_2NLi$, chloroborane lithium, lower aliphatic carboxylic acid lithium, lithium tetraphenyl borate, and imides.

In addition, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, and aluminum trichloride may be added to the electrolyte. If necessary, in order to impart incombustibility, the electrolyte may further include halogen-containing solvents such as carbon tetrachloride and ethylene trifluoride. Further, in order to enhance high-temperature storage characteristics, the electrolyte may further include carbon dioxide gas, fluoro-ethylene carbonate (FEC), propene sultone (PRS), fluoro-propylene carbonate (FPC), etc.

The present invention also provides a battery pack including the lithium secondary battery as a unit cell.

The present invention also provides a device using the battery pack as a power source.

In particular, the device may be selected from the group consisting of a mobile phone, a portable computer, a smartphone, a smart pad, a netbook, a light electric vehicle (LEV), an electric vehicle, a hybrid electric vehicle, a plug-in hybrid electric vehicle, and a device for storing power.

A structure of such a device and a method of manufacturing the same are publicly known in the art and, thus, detailed description thereof is omitted in the present specification.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a schematic view of an electrode according to an embodiment of the present invention;

FIG. 2 is a schematic view of an electrode according to another embodiment of the present invention;

FIG. 3 is a schematic view of an electrode according to another embodiment of the present invention; and FIG. 4 is a schematic view of an electrode according to another embodiment of the present invention.

MODE FOR INVENTION

Now, the present invention will be described in more detail with reference to the accompanying drawings. These examples are provided for illustrative purposes only and should not be construed as limiting the scope and spirit of the present invention.

FIG. 1 illustrates a schematic view of an electrode according to an embodiment of the present invention.

Referring to FIG. 1, an electrode 100 is composed of a current collector 130, the first electrode material layer 110 and a second electrode material layer 120.

The first electrode material layer 110 is formed on a back side of the current collector 130, and the second electrode material layer 120 is formed on an upper side of the current collector 130.

FIG. 2 illustrates a schematic view of an electrode according to another embodiment of the present invention.

Referring to FIG. 2, a first electrode material layer 210 is formed on an upper side of a current collector 230, and a second electrode material layer 220 is formed on an upper side of the first electrode material layer 210.

FIG. 3 illustrates a schematic view of an electrode according to another embodiment of the present invention.

Referring to FIG. 3, a first electrode material layer 310 is formed on an upper side of a right side of a current collector 330, and a second electrode material layer 320 is formed on an upper side of a left side of the current collector 330.

FIG. 4 illustrates a schematic view of an electrode according to another embodiment of the present invention.

Referring to FIG. 4, a first electrode material layer 410 is formed on a portion of an upper side of a current collector 430, and a second electrode material layer 420 is formed on the other portion of an upper side of the current collector 430 while covering an upper side of the first electrode material layer 410.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As described above, an electrode according to the present invention includes a first electrode material layer and second electrode material layer having different electrode active materials, thereby enhancing low-temperature output and energy density.

The invention claimed is:

1. A lithium secondary battery comprising an electrode having a positive polarity, the electrode comprising a current collector and an electrode material layer formed on the current collector, the electrode material layer comprising a first electrode material layer and a second electrode material layer having different electrode active materials,
   wherein the first electrode material layer is formed on a portion of a side of the current collector and the second electrode material layer is formed on a different portion of the side of the current collector such that the portion does not overlap with the different portion.

2. The lithium secondary battery according to claim 1, wherein the first electrode material layer comprises a first electrode material layer structure that is laminated and a second electrode material layer structure.

3. The lithium secondary battery according to claim 2, wherein the second electrode material layer comprises a third electrode material layer structure that is laminated and a fourth electrode material layer structure.

4. The lithium secondary battery according to claim 2, wherein the second electrode material layer is formed on the first electrode material layer.

5. The lithium secondary battery according to claim 4, wherein the first electrode material layer has a thickness ranging from 30 μm to 300 μm and the second electrode material layer has a thickness ranging from 1 μm to 300 μm.

6. The lithium secondary battery according to claim 1, wherein the first electrode material layer includes a first area and the second electrode material layer includes a second area such that a ratio of the first area relative to the second area ranges from 3:7 to 9:1.

7. The lithium secondary battery according to claim 1, wherein the second electrode material layer covers the first electrode material layer.

8. The lithium secondary battery according to claim 7, wherein a value obtained by subtracting a thickness of the first electrode material layer from a thickness of the second electrode material layer ranges from 1 μm to 300 μm.

9. The lithium secondary battery according to claim 1, wherein the first electrode material layer includes a first electrode active material and the second electrode material layer includes a second electrode active material, each of the first and second electrode active materials comprising at least one compound selected from the group consisting of a compound represented by formula (1), a compound represented by formula (2) and a compound represented by formula (3), wherein formula (1) is $Li_xM_yMn_{2-y}O_{4-z}A_z$,
   wherein $0.9 \leq x \leq 1.2$, $0 < y < 2$ and $0 \leq z < 0.2$, M is at least one element selected from the group consisting of Al, Mg, Ni, Co, Fe, Cr, V, Ti, Cu, B, Ca, Zn, Zr, Nb, Mo, Sr, Sb, W, Ti and Bi, and A is at least one monovalent or divalent anion,
wherein formula (2) is $(1-x)LiM'O_{2-y}A_{y}-xLi_2MnO_{3-y'}A_{y'}$,
   wherein M' is $Mn_aM_b$, M is at least one element selected from the group consisting of Ni, Ti, Co, Al, Cu, Fe, Mg, B, Cr, Zr, Zn and Period II transition metals, A is at least one selected from the group consisting of $PO_4$, $BO_3$, $CO_3$, F and $NO_3$, and $0 < x \leq 1$; $0 < y \leq 0.02$; $0 < y' \leq 0.02$; $0.5 \leq a \leq 1.0$; $0 \leq b \leq 0.5$; and $a+b=1$, and
wherein formula (3) is $Li_{1+a}Fe_{1-x}M''_x(PO_{4-b})X_b$,
   wherein M'' is at least one selected from Al, Mg and Ti; X is at least one element selected from F, S and N; and $-0.5 \leq a \leq +0.5$; $0 \leq x \leq 0.5$; and $0 \leq b \leq 0.1$.

10. The lithium secondary battery according to claim 1, wherein the lithium secondary battery comprises a carbon based material, Si, or the carbon based material and Si as a negative electrode active material.

11. The lithium secondary battery according to claim 1, wherein the lithium secondary battery is any one selected from the group consisting of a lithium ion battery, a lithium ion polymer battery and a lithium polymer battery.

12. A battery pack comprising two or more lithium secondary batteries, wherein each lithium secondary battery is according to claim 1.

13. A device using the battery pack according to claim 12 as an energy source, wherein the device is selected from the group consisting of a mobile phone, a portable computer, a smartphone, a smart pad, a netbook, a light electric vehicle, an electric vehicle, a hybrid electric vehicle, a plug-in hybrid electric vehicle and a device for storing power.

14. An electrode comprising a current collector and an electrode material layer formed on the current collector, the electrode material layer comprising a first electrode material layer and a second electrode material layer having different electrode active materials,
   wherein the first electrode material layer is formed on a portion of a side of the current collector and the second electrode material layer is formed on a different portion of the side of the current collector such that the portion does not overlap with the different portion, and
   wherein the first electrode material layer includes a first electrode active material and the second electrode material layer includes a second electrode active material, the first electrode active material including at least one lithium metal oxide selected from the compound represented by Formula (1) and the compound represented by Formula (2), and the second electrode active material including a lithium metal phosphate represented by Formula (3),
   wherein formula (1) is $Li_xM_yMn_{2-y}O_{4-z}A_z$,
      wherein $0.9 \leq x \leq 1.2$, $0 < y < 2$ and $0 \leq z < 0.2$, M is at least one element selected from the group consisting of Al, Mg, Ni, Co, Fe, Cr, V, Ti, Cu, B, Ca, Zn, Zr, Nb, Mo, Sr, Sb, W, Ti and Bi, and A is at least one monovalent or divalent anion,
   wherein formula (2) is $(1-x)LiM'O_{2-y}A_{y}-xLi_2MnO_{3-y'}A_{y'}$,
      wherein M' is $Mn_aM_b$, M is at least one element selected from the group consisting of Ni, Ti, Co, Al, Cu, Fe, Mg, B, Cr, Zr, Zn and Period II transition metals, A is at least one selected from the group consisting of $PO_4$, $BO_3$, $CO_3$, F and $NO_3$, and $0<x<1$; $0<y\le0.02$; $0<y'\le0.02$; $0.5\le a\le1.0$; $0\le b\le0.5$; and $a+b=1$, and wherein formula (3) is $Li_{1+a}Fe_{1-x}M''_x(PO_{4-b})X_b$, wherein M'' is at least one selected from Al, Mg and Ti; X is at least one element selected from F, S and N; and $-0.5\le a\le+0.5$; $0\le x\le0.5$; and $0\le b\le0.1$.

* * * * *